(12) United States Patent
Stucchi et al.

(10) Patent No.: US 10,725,951 B2
(45) Date of Patent: Jul. 28, 2020

(54) ACCESSORY DEVICE FOR AN ELECTRONIC PROTECTION RELAY

(71) Applicant: ABB S.p.A., Milan (IT)

(72) Inventors: Marco Stucchi, Osio Sotto (IT); Riccardo Panseri, Bergamo (IT); Matteo Cogi, Chiari (IT)

(73) Assignee: ABB S.p.A., Milan (IT)

( * ) Notice: Subject to any disclaimer, the term of this patent is extended or adjusted under 35 U.S.C. 154(b) by 62 days.

(21) Appl. No.: 15/488,193

(22) Filed: Apr. 14, 2017

(65) Prior Publication Data

US 2017/0300440 A1    Oct. 19, 2017

(30) Foreign Application Priority Data

Apr. 14, 2016  (EP) .................................... 16165257

(51) Int. Cl.
*G06F 11/30*    (2006.01)
*G06F 13/366*   (2006.01)
(Continued)

(52) U.S. Cl.
CPC ........ *G06F 13/366* (2013.01); *G06F 13/4022* (2013.01); *G06F 13/4068* (2013.01);
(Continued)

(58) Field of Classification Search
CPC combination set(s) only.
See application file for complete search history.

(56) References Cited

U.S. PATENT DOCUMENTS

2003/0204756 A1*  10/2003  Ransom ................. G01D 4/004
                                                   713/300
2004/0138786 A1*   7/2004  Blackett ................. G01D 4/00
                                                   700/295
(Continued)

OTHER PUBLICATIONS

European Search Report, for EP16165257.3, completed Oct. 12, 2016, 6 pages.

*Primary Examiner* — Ilwoo Park
(74) *Attorney, Agent, or Firm* — J. Bruce Schelkopf; Taft Stettinius & Hollister LLP

(57) ABSTRACT

An accessory device for an electronic protection relay comprising: a first communication port for communication with one or more electronic devices of the electronic protection relay or operatively connected with the electronic protection relay; a second communication port for communication with one or more computerized units through the Internet; a first processing means to manage the operation of the accessory device, the first processing means being operatively coupled with the first and second communication ports. The accessory device is configured to execute a data-gathering procedure (DGP), in which the accessory device polls one or more electronic devices, which are in communication with the accessory device through the first communication port, and receives grid data (D), which are related to the operation of an electric power distribution grid including the electronic protection relay, from the electronic devices in response to the polling. The accessory device is configured to execute a data-publishing procedure (DPP), in which the accessory device transmits the grid data (D) to a publishing computerized unit, which is in communication with the accessory device through the second communication port.

18 Claims, 9 Drawing Sheets

(51) Int. Cl.
*H02H 1/00* (2006.01)
*G06F 13/40* (2006.01)
*H02H 7/26* (2006.01)

(52) U.S. Cl.
CPC ........ *H02H 1/0061* (2013.01); *H02H 1/0092* (2013.01); *H02H 7/26* (2013.01)

(56) References Cited

U.S. PATENT DOCUMENTS

| | | | | |
|---|---|---|---|---|
| 2004/0162642 | A1* | 8/2004 | Gasper | H02J 13/001 |
| | | | | 700/286 |
| 2009/0066527 | A1* | 3/2009 | Teachman | G01R 22/10 |
| | | | | 340/657 |
| 2013/0204450 | A1* | 8/2013 | Kagan | H04L 67/06 |
| | | | | 700/291 |
| 2015/0372539 | A1* | 12/2015 | Livadaras | G05B 15/02 |
| | | | | 700/297 |
| 2017/0188308 | A1* | 6/2017 | Nolan | H04W 52/0258 |

* cited by examiner

ACCESSORY DEVICE FOR AN ELECTRONIC PROTECTION RELAY

The present invention relates to the field of electric power distribution grids, preferably operating at low voltage level.

For the purposes of the present application, the term "low voltage" (LV) relates to operating voltages lower than 1 kV AC and 1.5 kV DC.

As is known, low voltage switchgear installations comprise switching devices (e.g. circuit breakers, disconnectors, contactors, and the like) designed to enable specific sections of an electric power distribution grid to properly operate.

Typically, the above-described switching devices are operatively associated with electronic protection devices (also known as "electronic protection relays"), which are adapted to check the operating conditions of the switchgear by means of suitable sensors and generate suitable commands to prompt the intervention of associated switching devices in the event of failures or overloads.

In addition to serving the above-mentioned protection and control purposes, electronic protection relays can collect and provide data sets related to the operating status of the switchgear or other portions of the electric power distribution grid, in which they are installed. In currently available arrangements for monitoring the operating status of an electric power distribution grid, complex and expensive solutions are adopted to make these data sets available at remote level.

The above mentioned drawback actually impedes a full exploitation of the data collected by the electronic protection relays to provide advanced monitoring services to the customer.

In accordance to the most recent market developments, it is therefore quite felt the need for solutions capable of ensuring an easy and efficient remote access to the amount of data collected by the electronic protection relays at low costs, with high levels of flexibility in use and without the need of relevant interventions on the communication structure of the switchgear, in which said electronic protection relays are installed.

In order to respond to this need, the present invention provides an accessory device for an electronic protection relay, according to the following claim 1 and the related dependent claims. A further aspect of the present invention relates to an electronic protection relay, according to the following claim 12.

Yet a further aspect of the present invention relates to a computerized platform for remotely monitoring the operation of an electric power distribution grid, according to the following claim 13.

Characteristics and advantages of the present invention will emerge more clearly from the description of preferred, but not exclusive embodiments of the accessory device, according to the invention, of which non-limiting examples are shown in the attached drawings, wherein.

Figure 1:
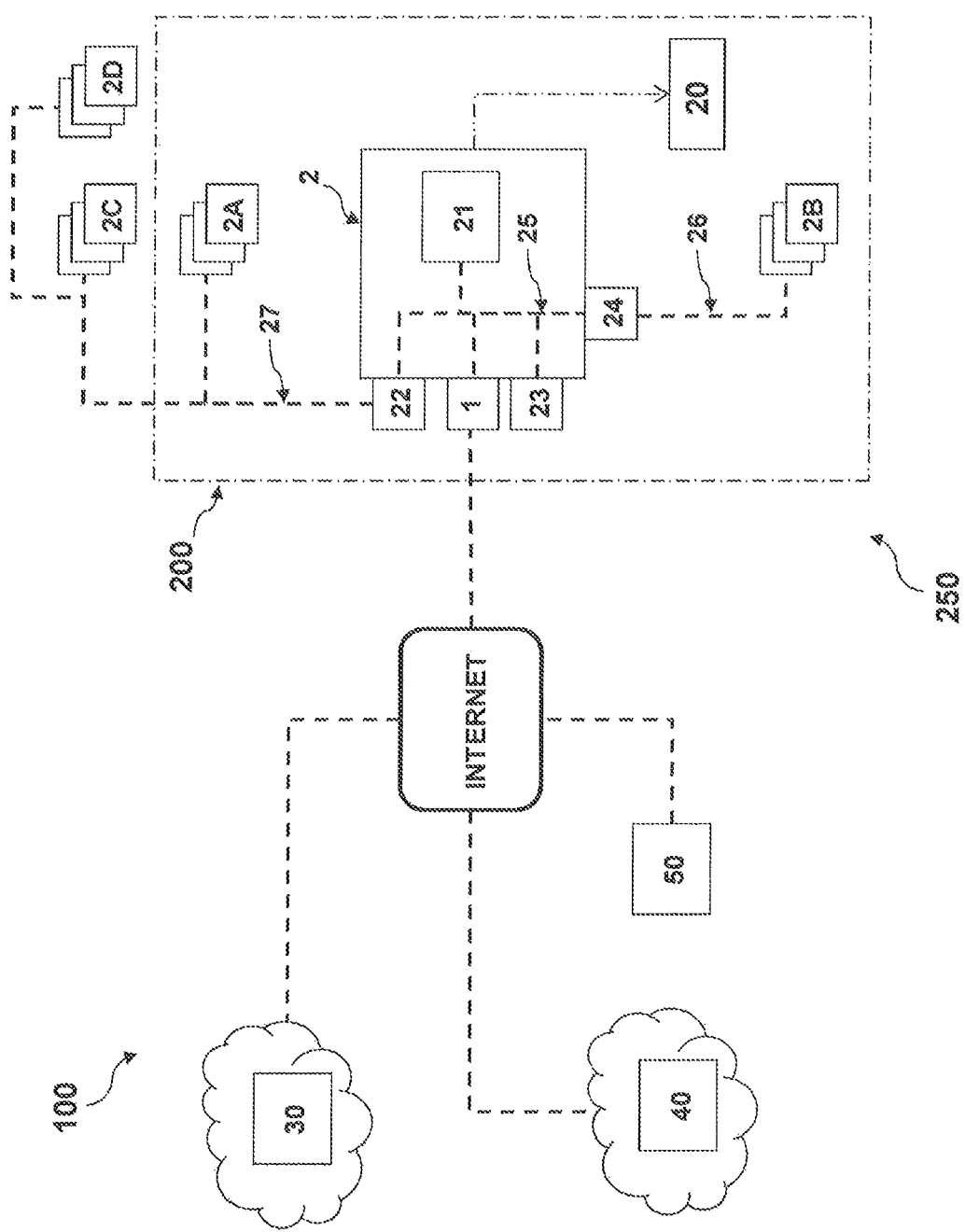
FIGS. 1-2 are schematic views showing a computerized platform including the accessory device, according to the invention.
Figure 2:
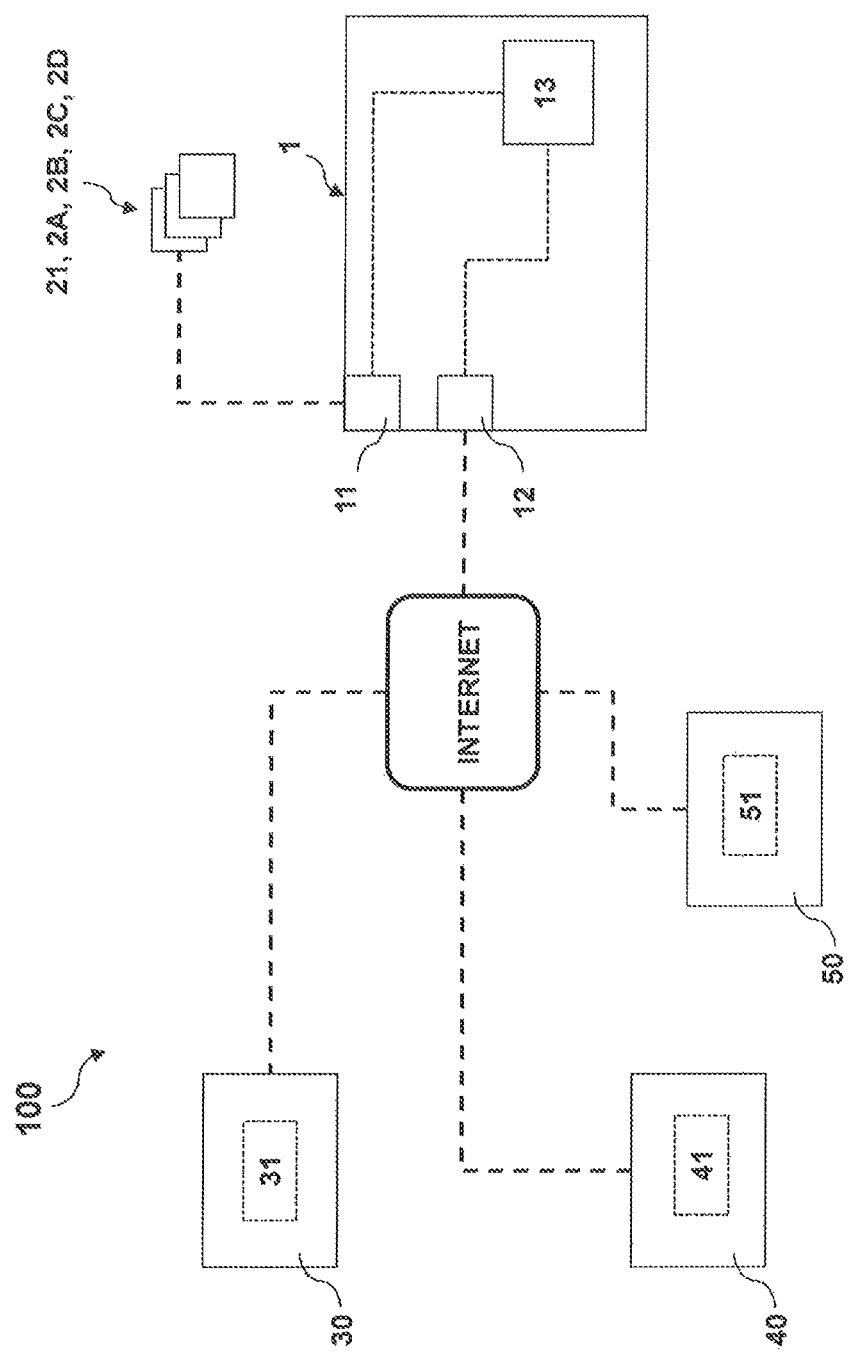

With reference to the above-mentioned figures, the present invention refers to an accessory device 1 for an electronic protection relay 2 of an electric power distribution grid 250, which preferably operates at low voltage level.

The electronic protection relay 2 may be operatively associated with a switching device 20 (e.g. a circuit breaker, disconnector, contactor, or the like) of the electric power distribution grid 250.

The electronic protection relay 2 and, possibly, the associated switching device 20 are preferably included in a switchgear 200 of the electric power distribution grid 250.

The switchgear 200 may include further electrical switching devices (not shown) and further electronic protection devices 2A, 2B.

The electric power distribution grid 250 may include further electrical switching devices (not shown), further electronic protection devices 2C outside the switchgear 200 or other generic electronic devices 2D (e.g. temperature or moisture sensors, water or gas meters, and the like) outside the switchgear 200.

Obviously, the electric power distribution grid 250 and the switchgear 200 may include electronic device of different types from those mentioned above.

Preferably, the electronic protection relay 2 comprises a protection and control unit 21, which may be of known type.

The protection and control unit 21 is configured to acquire data related to the operating conditions of the electric power distribution grid 250, check the operating conditions of this latter and generate suitable commands to prompt the intervention of the associated switching device 20 in the event of anomalous conditions, e.g. faults or overloads.

Preferably, the electronic protection relay 2 comprises or is operatively coupled with one or more further accessory devices 22, 23, 24, which may be of known type.

The accessory devices 22, 23, 24 may include, for example, electronic devices designed to potentiate/expand the functions of the protection and control unit 21 (e.g. the accessory device 23), electronic devices configured to provide an interface towards external communication buses (e.g. the accessory devices 22, 24), electronic devices intended to provide auxiliary interfaces for the protection and control unit 21 (such as a display or a LED interface), and the like.

Preferably, the electronic protection relay 2 comprises a first communication bus 25 (here also referred to as "local bus") designed to provide a communication channel between the protection and control unit 21 and other electronic devices 22, 23, 24 of the electronic protection relay 2. Preferably, the local bus 25 implements a communication protocol of the FIELDBUS type, such as CAN or ETHERNET, using communication modalities of the "multi-master" type. Preferably, the electronic protection relay 2 can communicate with further several electronic protection devices 2A, 2C, which may be located inside or outside the switchboard 200, through a second communication bus (here also referred to as "system bus") of the electric power distribution grid 250, which is designed to provide a communication channel between the protection and control unit 21 and further electronic protection relays.

Preferably, the system bus 27 implements a communication protocol of the MODBUS, PROFIBUS, PROFINET or MODBUS-TCP type, using communication modalities of the "master-slave" type.

Preferably, the electronic protection relay 2 can communicate with further several electronic protection devices 2B of the switchgear 200 through a third communication bus 26 (here also referred to as "switchboard bus") of this latter, which is designed to provide a dedicated communication channel between the protection and control unit 21 and further electronic protection relays of the switchgear 200.

Preferably, the switchboard bus 26 implements a communication protocol of the FIELDBUS type, such as CAN or ETHERNET, using communication modalities of the "multi-master" type.

According to the invention, the accessory device 1 is adapted to be operatively coupled with the electronic protection relay 2 or be included in this latter.

In some embodiments (FIGS. 3-4), the accessory device 1 is adapted to be removably mounted together with the corresponding electronic protection relay 2 on the switching device 20.

However, other solutions are possible depending on how the electronic protection relay 2 is realized.

As an example (not shown), the accessory device 1 may be removably mounted on the external case of the electronic protection relay 2, when this latter is a self-standing unit.

As a further example (not shown), the accessory device 1 may be an internal electronic module integrated within the electronic protection relay 2.

Figure 3:
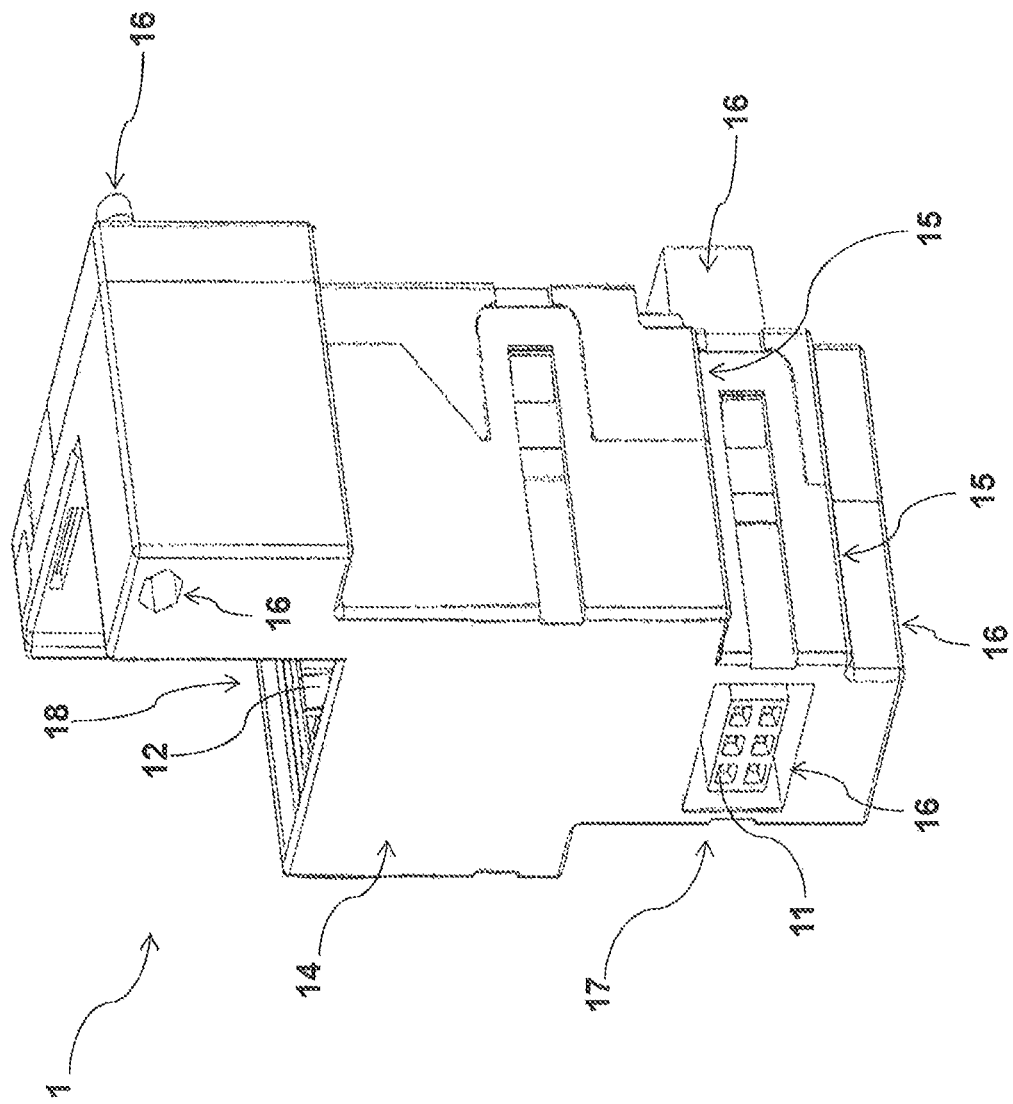
FIG. 3 is a schematic view showing the accessory device, according to the invention.
Figure 4:
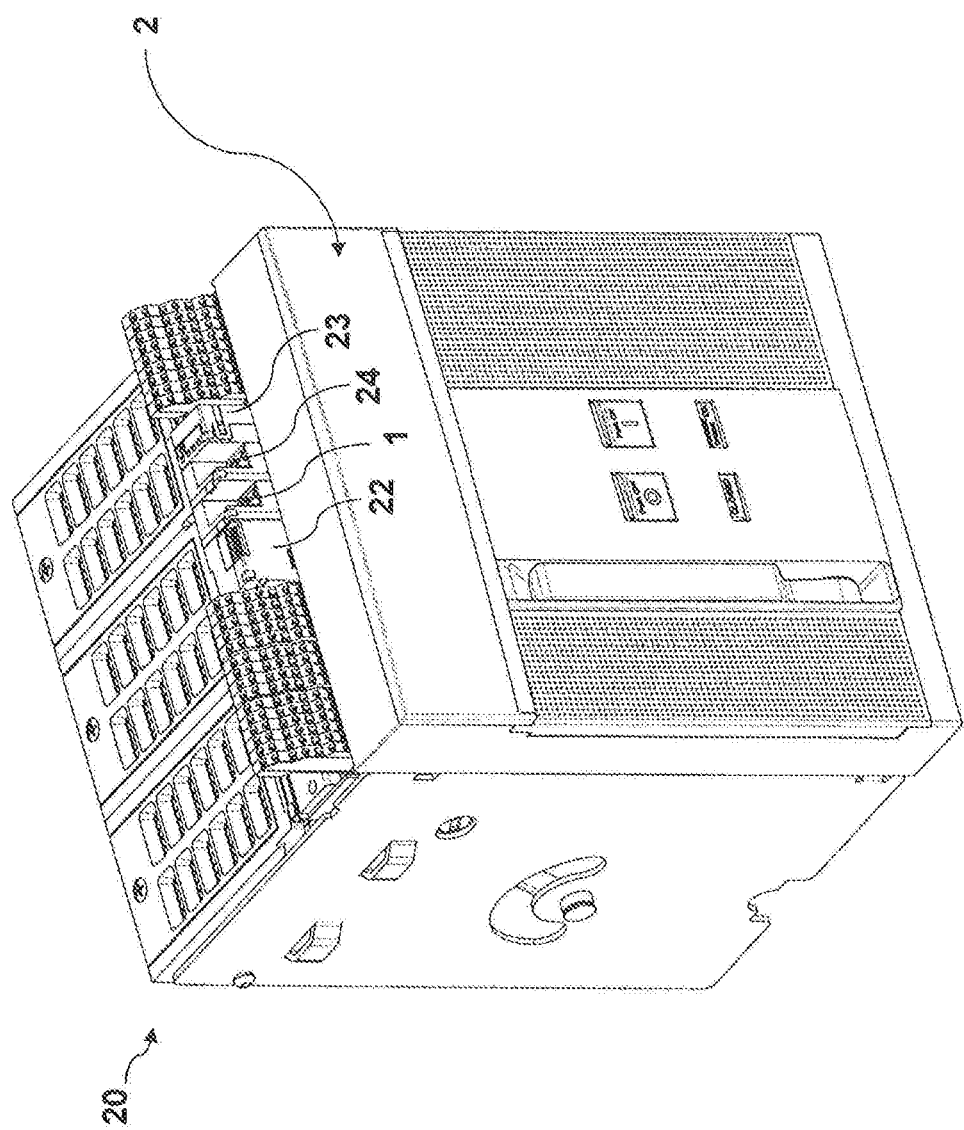
FIG. 4 is a schematic view showing the accessory device of FIG. 3 operatively mounted on a LV switching device.

According to the embodiment shown in FIGS. 3-4, the accessory device 1 comprises an outer housing 14, preferably of insulating material.

Preferably, the accessory device 1 comprises first mechanical connection means 15 for mechanical connection with the switching device 20.

The mechanical connection means 15 may include coupling surfaces of the outer housing 14, which are arranged to be geometrically complementary with corresponding coupling surfaces of the switching device 20.

Preferably, the accessory device 1 comprises second mechanical connection means 16 for mechanical connection with the electronic protection relay 2 and other accessory devices 22, 24.

The mechanical connection means 16 may include coupling surfaces of the outer housing 14, which are arranged to be geometrically complementary with corresponding coupling surfaces of the electronic protection relay 2 and other accessory devices 22.

According to the invention, the accessory device 1 comprises at least a first communication port 11 and at least a second communication port 12.

The communication port 11 is adapted to communicate with electronic devices included in or operatively connected with the electronic protection relay 2, e.g. the protection and control unit 21, the accessory devices 22, 23, 24 or the electronic protection relays 2A, 2B, 2C. Information may be transmitted through the local bus 25 and possibly through the switchboard bus 26 and the system bus 27 (using in this case the accessory devices 22, 24 as gateways). As an example, the communication port 11 may be a CAN or ETHERNET port.

The communication port 12 is adapted to communicate with one or more remote computerized units 30, 40, 50 through the Internet.

Information may be transmitted through an Internet line by means of a suitable communication cable (e.g. of the CAN or ETHERNET type) or even by means of a suitable antenna arrangement (e.g. of the Wi-Fi or Bluetooth type). As an example, the communication port 12 may be a TCP or UDP port suitable for an Internet protocol suite.

Referring again to the embodiment shown in FIGS. 3-4, the accessory device 1 preferably comprises first electrical connection means 17 for electrical connection with one or more electronic devices of the electronic protection relay 2, e.g. the protection and control unit 21 and the accessory devices 22, 23, 24.

Preferably, the first electrical connection means 17 comprise one or more socket or plug elements integrated with the outer housing 14, each of which may advantageously comprise power contacts configured to form a power supply port and communication contacts configured to form a communication port 11.

The accessory device 1 preferably comprises also second electrical connection means 18 for electrical connection with an Internet line through one or more communication cables.

Preferably, the second electrical connection means 18 comprise one or more socket or plug elements integrated with the outer housing 14, each of which may advantageously comprise communication contacts configured to form a communication port 12.

It is evident how in the embodiment shown in FIG. 3-4, the accessory device 1 is configured to be installed according to a "plug & play" mode, thereby being mountable on the switching device 20 and connectable with the components of the electronic protection relay.

This solution remarkably simplifies the installation and use of the accessory device 1.

As it will better emerge from the following, the accessory device 1 is adapted to collect grid data D and transmit said grid data to one or more remote computerized units 30, which are preferably part of a cloud computing architecture.

To this aim, the accessory device 1 comprises first processing means 13 configured to manage its operation. As an example, the processing means 13 may comprise one or more processing devices, e.g. microprocessors, one or more memories operatively coupled to said processing devices and a software stored in said memories and executable by said processing devices.

The first processing means 13, in particular the processing devices thereof, are operatively coupled with the first and second communication ports 11, 12.

In general, the accessory device 1 can communicate with the protection and control unit 21, with one or more further accessory devices 22, 23, 24 of the electronic protection relay 2 (through the local bus 25), with one or more further electronic devices 2A, 2B, 2C, 2D in communication with the electronic protection relay 2 (through the communication buses 25, 26, 27 and the accessory devices 22, 24) and with one or more remote computerized units 30, 40, 50 (through the Internet).

In the exemplificative embodiment shown in figure, the accessory device 1 does not collect data directly from the accessory module 23 but it collects data related to the accessory device 23 from the protection and control unit 21, which is in communication with this latter through the local bus 25.

In the exemplificative embodiment shown in figure, the accessory device 1 preferably collects data from the electronic devices 2A, 2B, 2C, 2D through the communication buses 25, 26, 27 and the accessory devices 22, 24. These latter preferably operate as communication interfaces and are therefore functionally transparent to the accessory device 1.

Of course, other configurations of the data flow to/from the accessory device 1 are possible according to the needs.

It is important to notice that the accessory device 1 is capable of providing the electronic protection relay 2, to which it is operatively associated, with a direct connection to the Internet without the need of using or arranging dedicated communication buses (such as e.g. the system bus 27).

In practice, the accessory device 1 can operate as an Internet gateway, which is capable of collecting the grid data at a switchgear level and to transmit said grid data through the Internet in order allow them to be processed at a remote computing level (e.g. at a cloud computing level).

According to the invention, the accessory device 1 is configured to execute a data-gathering procedure DGP, in which it polls one or more electronic devices 21, 2A, 2B, 2C, 2D, which are in communication with said accessory device through the first communication port 11, and receives grid data D from said electronic devices in response to such polling activity.

The grid data D comprise information related to the operation of the electric power distribution grid 250, e.g. data related to measured electrical quantities, setting parameters, control variables, and the like, which may concern any devices or components included in the electric power distribution grid 250.

Preferably, the accessory device 1 is configured to execute the data-gathering procedure DGP basing on information included in a stored data-gathering file DGF, which may be memorised in a permanent memory location of the processing means 13.

The data-gathering file DGF advantageously includes information allowing the accessory device 1 to correctly interact with the electronic devices 21, 2A, 2B, 2C, 2D of interest and correctly acquire and store the grid data D.

As an example, the data-gathering file DGF may comprise information on the electronic devices 21, 2A, 2B, 2C, 2D to poll, on the communication addresses of said electronic devices, on the communication buses 25, 26, 27 to use to communicate with said electronic devices, on the type of grid data D to gather, and the like.

Advantageously, the accessory device 1 is configured to operate as a "master" device to execute the data-gathering procedure DGP, i.e. it can take the initiative for communicating with a slave device of interest (e.g. one of the electronic devices 21, 2A, 2B, 2C. 2D) at any time, obviously in accordance with the timing information stored in the data-gathering file DGF.

By acting as a master device, the accessory device 1 can optimize the execution of the data-gathering procedure DGP from many points of view, e.g. by oversampling data when possible or by properly tuning the data-gathering strategy in relation to the kind of data to be collected (e.g. some data like measurement data require a continuous update, while other configuration data can be sampled less frequently as they seldom change).

According to an embodiment of the invention, the data-gathering procedure DGP comprises a sequence of steps, which are cyclically repeated at subsequent sampling periods TS to acquire subsequent data-gathering samples DGS of grid data D from the electronic devices 21, 2A, 2B, 2C, 2D of interest.

In other words, at each sampling period TS, the data-gathering procedure DGP is executed by the accessory device 1 to acquire in parallel data-gathering samples DOS from the electronic device 21, 2A, 2B, 2C, 2D of interest.

Preferably, the data-gathering samples DOS are records of data having a predefined size specified in the data-gathering file DGF.

Preferably, the sampling period TS is a time interval having a predefined duration specified in the data-gathering file DGF.

Figure 5:
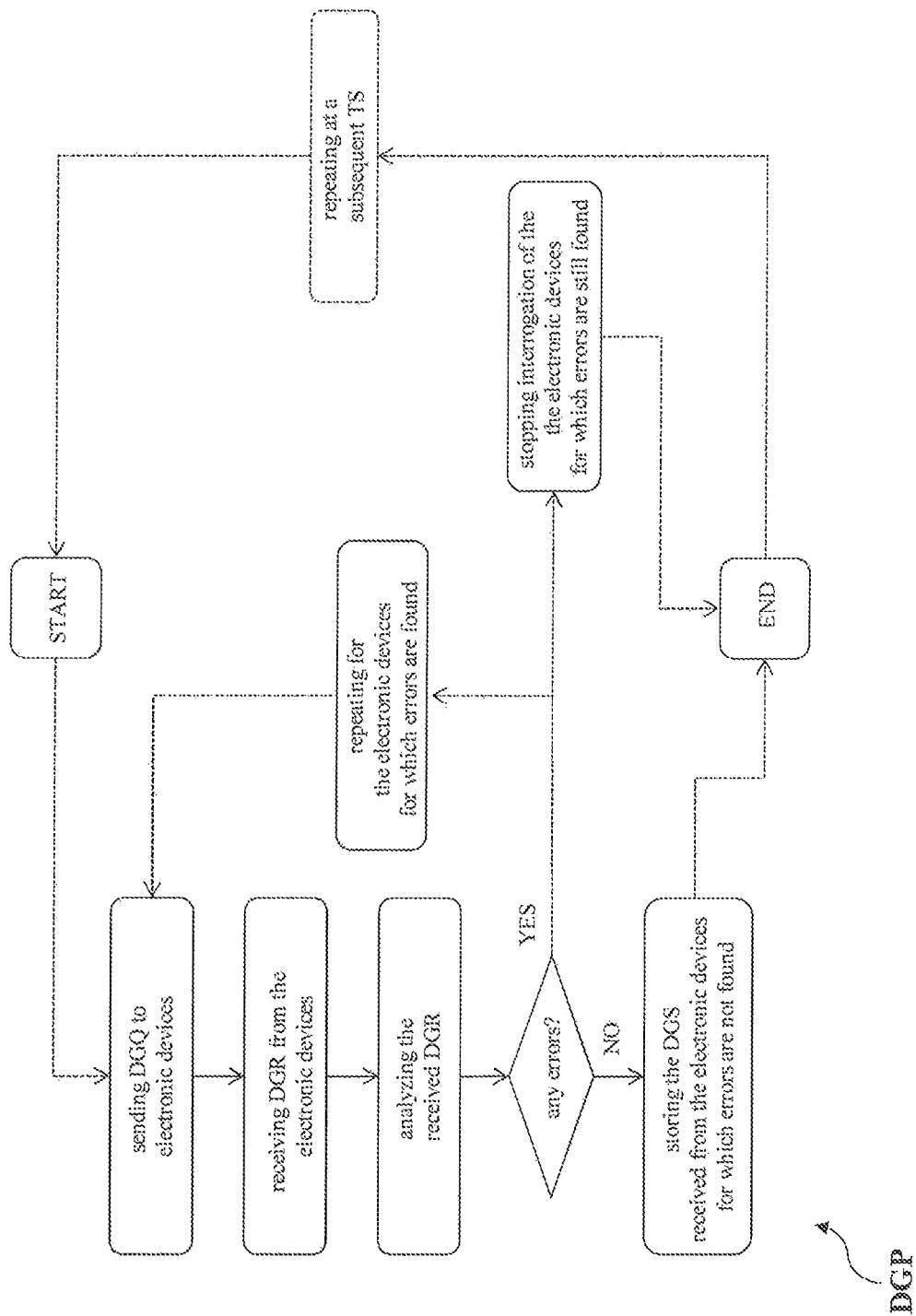
FIGS. 5-9 are schematic views showing the operation of the accessory device, according to the invention.

Referring now to FIG. 5, the steps of the data-gathering procedure DGP are now described in more details.

Preferably, the data-gathering procedure DGP provides for some interrogation steps of the electronic devices 21, 2A, 2B, 2C, 2D of interest.

Preferably, the data-gathering procedure DGP comprises a step, in which the accessory device 1 sends in parallel data-gathering queries DGQ to the electronic devices 21, 2A, 2B, 2C, 2D of interest.

The data-gathering queries DGQ are provided by the accessory device 1 basing on information included in the data-gathering file DGF, in which the electronic devices to be interrogated and the grid data to be acquired are specified.

Preferably, the data-gathering procedure DGP comprises a step, in which the accessory device 1 receives data-gathering responses DGR from the polled electronic devices to which the data-gathering queries DGQ were sent.

Normally, each data-gathering response DGR comprises a corresponding data-gathering sample DOS.

Preferably, the data-gathering procedure DGP comprises a step, in which the accessory device 1 analyses the data-gathering responses DGR received from the polled electronic devices in order to check the presence of errors.

The data-gathering procedure DGP comprises a step, in which the accessory device 1 stores the data-gathering samples DOS received from the electronic devices for which no errors are found in the corresponding data-gathering responses DGR.

Otherwise, the data-gathering procedure DGP provides for repeating the previous interrogation steps for a given number of times (2-3 times) in relation to the electronic devices for which errors are found in the corresponding data-gathering responses DGR.

The data-gathering procedure DGP provides for stopping the interrogation of the electronic devices for which errors are still found in the corresponding data-gathering responses DGR even if the interrogation steps illustrated above are repeated for said number of time.

The data-gathering procedure DGP ends when the above mentioned steps are completed (within the sampling period TS) for all the electronic devices 21, 2A, 2B, 2C, 2D of interest.

The data-gathering procedure DGP will then be repeated by the accessory device 1 for the electronic devices 21, 2A, 2B, 2C, 2D of interest (as specified in the data-gathering file DGF) at a subsequent sampling period TS.

According to the invention, the accessory device 1 is configured to execute a data-publishing procedure DPP, in which it transmits the stored grid data D to a remote publishing computerized unit 30, which is in communication with said accessory device through the second communication port 12 of this latter (in other words through the Internet).

The publishing computerised unit 30 is configured to interact with the accessory device 1 to acquire and store grid data D related to the operation of the electric power distribution grid 250. To this aim, the publishing computerised unit 30 may comprise second processing means 31 configured to manage its operation. As an example, the processing means 31 may comprise one or more processing devices, e.g. microprocessors, one or more memories operatively coupled to said processing devices and a software stored in said memories and executable by said processing devices.

The publishing computerized unit 30 may consist of a single computerized unit or of several computerized units connectable to the Internet and interacting one with another, for example to implement a cloud computing architecture.

As an example, the publishing computerized unit 30 may be a computer unit provided with an operating system for devices with "server" type functionalities, for example Windows Server™, Windows Azure™, Mac OS Server™ or the like.

Preferably, the accessory device 1 is configured to execute the data-publishing procedure DPP basing on information included in the data-gathering file DGF and in a stored data-publishing file DPF, which may be memorised in a permanent memory location of the processing means 13.

The data-publishing file DPF advantageously includes information to allow the accessory device 1 to correctly interact with the computerized publishing unit 30 through the Internet and correctly transmit the grid data D to this latter.

As an example, the data-publishing file DPF may comprise information on the communication addresses of the computerized unit 30, information on digital certificates to safely interact with the publishing computerized unit 30, and the like.

Advantageously, the accessory device 1 is configured to operate as a "client" device to execute the data-publishing procedure DPP, i.e. it can take the initiative for communicating with the publishing computerised unit 30 only when requested or in accordance with the timing information stored in the data-gathering file DGF.

This allows reducing vulnerability of the Internet connection of the accessory device 1.

According to an embodiment of the invention, the data-publishing procedure DPP comprises a sequence of steps, which are cyclically repeated at subsequent publishing periods TP to transmit a transmission file TF having a predefined transmission format to the publishing computerised unit 30.

The transmission file TF is created by means of a given number of data-publishing samples DPS of grid data D, which are preferably uploaded from a temporary memory (of the volatile or non-volatile type) into a memory buffer at subsequent corresponding uploading periods TU. Each uploading period TU has a duration shorter than or equal to the duration of a publishing period TP, e.g. in such a way that a transmission file TF is formed by one or more subsequent uploaded data-publishing samples DPS.

Preferably, the duration of the uploading period TU and the duration of the publishing period TP are specified in the data-gathering file DGF whereas the size of the data-publishing samples DPS, the size of the transmission file TF are calculated by the accessory device 1.

Preferably, the transmission format of the transmission file TF is a lightweight data-interchange format, such as JSON (Java Script Object Notation).

Figure 6:
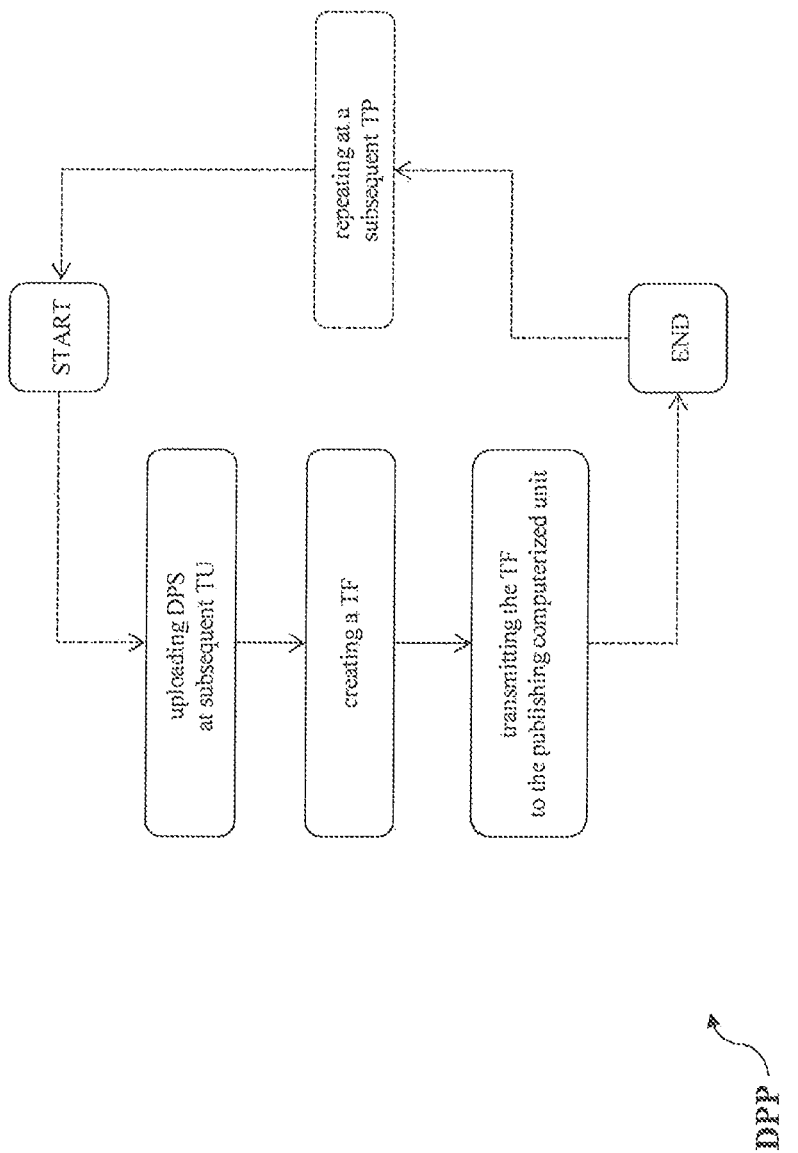

Referring now to FIG. 6, the steps of the data-publishing procedure DPP are now described in more details.

The data-publishing procedure DPP comprises a step, in which the accessory device 1 uploads one or more data-publishing samples DPS at subsequent uploading periods TU.

The data-publishing procedure DPP comprises a further step, in which the accessory device 1 creates a transmission file TF using the uploaded data-publishing samples DPS.

The data-publishing procedure DPP then comprises a step, in which the accessory device 1 transmits the transmission file TF to the publishing computerized unit 30.

Preferably, the address of the publishing computerized unit 30 is specified in the data-publishing file DPF.

Preferably, the transmission of the transmission file TF occurs using a secure protocol (e.g. TLS—Transport Layer Security) in order to ensure a safe identification of the accessory device 1 with the publishing computerised unit 30 and a safe data transmission to this latter.

Upon the transmission of the transmission file TF, the data-publishing procedure DPP ends and will be repeated by the accessory device 1 at a subsequent publishing period TP.

According to an aspect of the invention, the accessory device 1 is configured to execute a data logging procedure DLP, in which it refines and reorganizes the stored data samples DGS basing on information included in the data-gathering file DGF and in the data-publishing file DPF.

The data logging procedure DLP is basically directed at re-structuring the acquired grid data D to make them more suitable for transmission to the publishing computerised unit 30.

As an example, the acquired grid data D may be sized with a given granularity suitable for transmission to the publishing computerised unit 30.

Preferably, the data logging procedure DLP comprises a sequence of steps, which are cyclically repeated at subsequent logging periods TL.

Each logging period TL has a duration longer than the duration of a sampling period TS, e.g. ten times longer.

Figure 7:
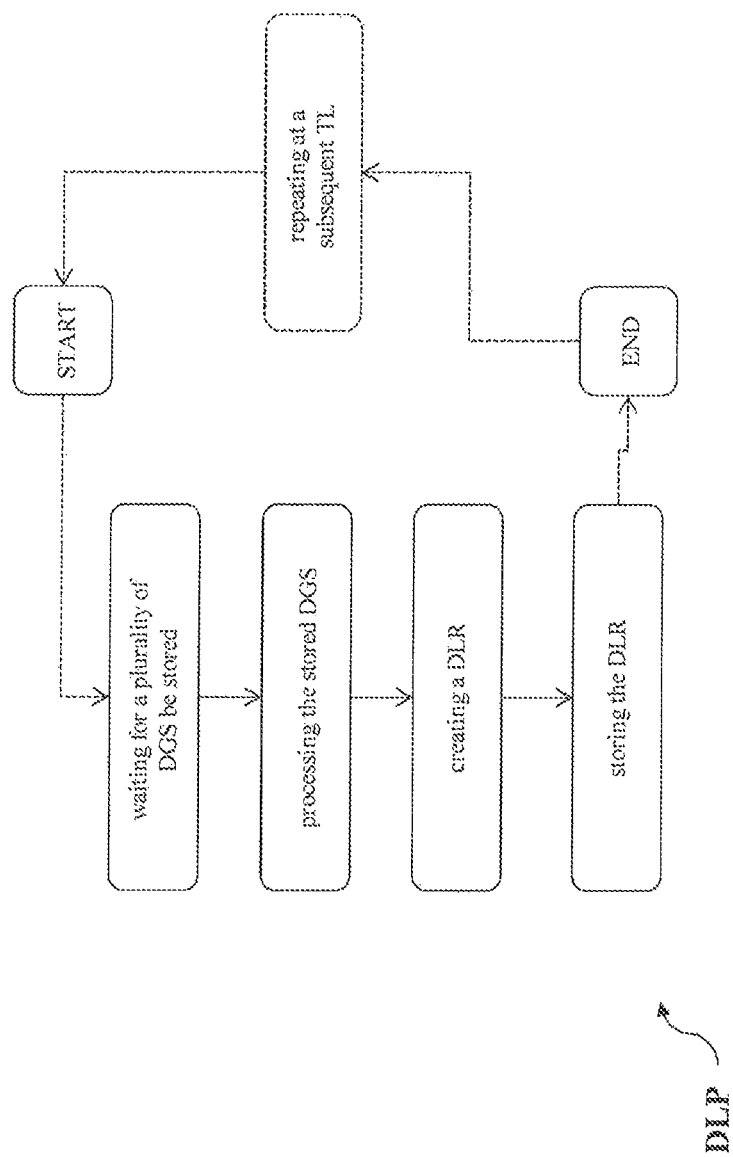

Referring now to FIG. 7, the steps of the data logging procedure DLP are now described in more details.

The data logging procedure DLP comprises a step, in which the accessory device 1 waits for a plurality of data-gathering samples DOS are stored in a memory buffer.

Preferably, the data logging procedure DLP comprises a step of processing the acquired data-gathering samples DOS to extract or derive additional information on the operation of said electric power distribution grid 250 from said data-gathering samples DGS.

As an example, suitable calculation algorithms may be used to obtain data related to maximum, minimum or mean values of given quantities from the acquired data-gathering samples DOS, to interpolate the acquired data-gathering samples DOS or to track changes of data or parameters at subsequent logging periods TL.

The data logging procedure DLP comprises a further step, in which the accessory device 1 creates a data logging record DLR using such plurality of stored data-gathering samples DGS and the additional information obtained by processing said data-gathering samples.

Preferably, each data logging record DLR is structured on the base of information specified in the data-gathering file DGF.

As an example, each data logging record DLR has a size depending on the size of the data-gathering samples DGS. Furthermore the number of data logging records DLR that can be set at each publishing period TP depends on the size of the available memory to store the logging records DLR, the duration of the logging period TL and the size of the logging records DLR.

Preferably, all these reference values are specified in the data-gathering file DGF or calculated by the accessory device 1.

The data logging procedure DLP comprises a further step, in which the accessory device 1 stores the created data logging record DLR in a permanent memory.

The data logging procedure DLP is then repeated by the accessory device 1 at a subsequent logging period TL.

It is evident from the above that the data logging procedure DLP may be executed by the accessory device 1 concurrently with the data-gathering procedure DGP described above.

According to an aspect of the invention, the accessory device 1 is configured to interact with at least an interface computerized unit 40, which is capable of communicating with the accessory device 1 through the second communication port 12 (in other words through the Internet).

The interface computerized unit 40 is configured to provide interface services to facilitate the interaction of the accessory device 1 with the publishing computerised unit 30.

This solution is quite advantageous as it allows easily fitting, in very flexible way, the operation of the accessory device 1 with possible configuration changes of the publishing computerised unit 30.

The interface computerised unit 40 may comprise third processing means 41 configured to manage its operation. As an example, the processing means 41 may comprise one or more processing devices, e.g. microprocessors, one or more memories operatively coupled to said processing devices and a software stored in said memories and executable by said processing devices.

The interface computerized unit 40 may consist of a single computerized unit or several computerized units connectable to the Internet and interacting one with another, for example to implement a cloud computing architecture.

As an example, the interface computerized unit 40 may be a computer unit provided with an operating system for devices with "server" type functionalities, for example Windows Server™, Windows Azure™, Mac OS Server™ or the like.

Preferably, the accessory device 1 is configured to upload the data-publishing file DPF from the interface computerized unit 40 during a configuration stage or during its normal operation. According to an aspect of the invention, the accessory device 1 is configured to execute a data upload procedure DUP, in which it uploads updating data UD from the interface computerized unit 40.

The data uploading procedure DUP is basically directed at uploading the information needed to update the functionalities of the accessory device 1 for safety reasons or in consideration of possible upcoming changes in the interaction with the publishing computerized unit 30 or in consideration of operation changes of the accessory device itself.

Advantageously, the accessory device 1 is configured to operate as a "client" device to execute the data uploading procedure DUP, i.e. it can take the initiative for communicating with the interface computerised unit 40 only when requested or in accordance with the timing information stored in the data-gathering file DGF.

Preferably, the data uploading procedure DUP comprises a sequence of steps, which are cyclically repeated at subsequent updating periods TU during its normal operation.

Figure 8:
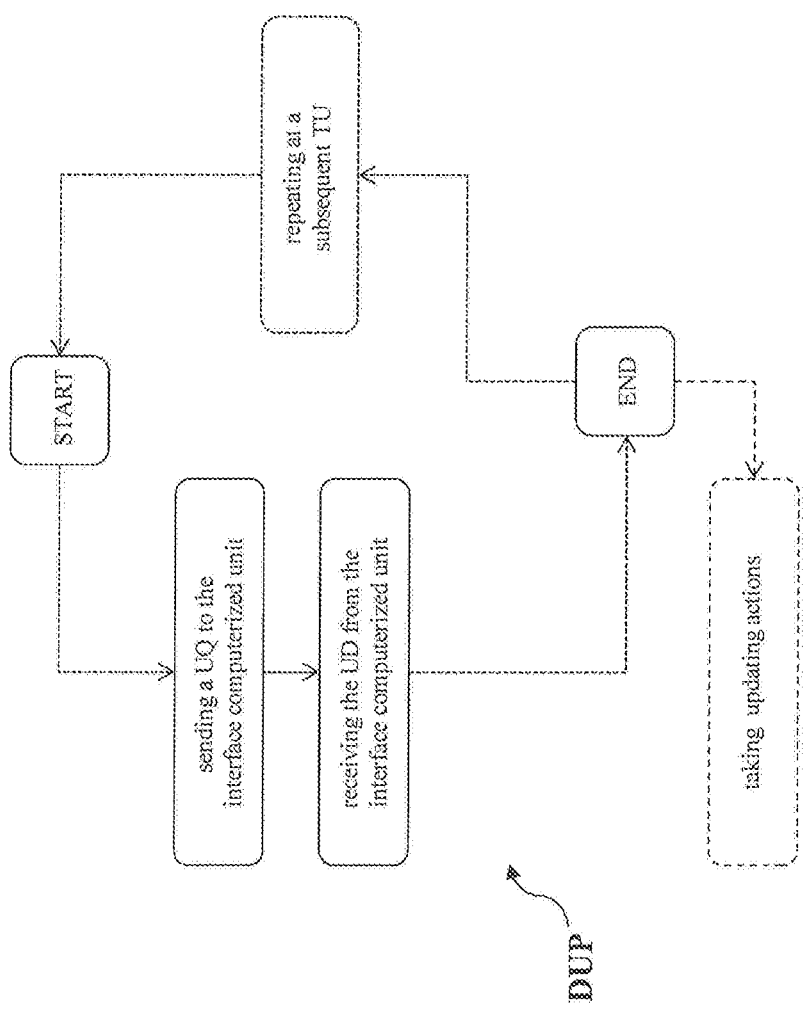

The duration of the updating period TU is preferably specified in the data-gathering file DGF. Referring now to FIG. 8, the steps of the data uploading procedure DUP are now described in more details.

The data updating procedure DUP comprises an initial step, in which the accessory device 1 sends an updating query UQ to the interface computerized unit 40.

The data updating procedure DUP comprises a further step, in which the accessory device 1 receives the updating data UD from the interface computerised unit 40.

The updating data UD may comprise, for example, renewing data for the digital certificates to be used to safely interact with the publishing computerised unit 30, data on an available new firmware, data on an available new data-publishing file DPF, and the like.

As a further example, the updating data UD may even comprise new setting or control parameters for the protection and control unit 21 or other electronic protection relays 2A, 2B, 2C in communication with the accessory device 1.

Following to the reception of the mentioned updating data, the accessory device 1 can take suitable updating actions by interacting with other remote computerized units through the Internet or other electronic devices 21, 2A, 2C, 2D through suitable communication buses.

As an example, the accessory device 1 may upload new firmware portions from a suitable computerised unit (not shown), the address of which is specified in the updating data UD.

As a further example, the accessory device 1 may upload a new data-publishing file DPF directly from the interface computerised unit 40 at a given uploading time specified in the updating data UD.

As a further example, the accessory device 1 may transmit (through the communication port 11) possible new setting or control parameters to the protection and control unit 21 or to the protection and control unit of other electronic protection relays 2A, 2B, 2C in communication with the accessory device 1.

According to an aspect of the invention, the accessory device 1 is configured to interact with at least a configuration computerized unit 50, which is capable of communicating with the accessory device 1 through the second communication port 12 (in other words through the Internet).

As it will be evident from the following, the configuration computerized unit 50 is also capable of communicating with the interface computerised unit 40 through the Internet.

The configuration computerized unit 50 is configured to manage the operative configuration of the accessory device 1.

The configuration computerized unit 50 may comprise fourth processing means 51 configured to manage its operation. As an example, the processing means 51 may comprise one or more processing devices, e.g. microprocessors, one or more memories operatively coupled to said processing devices and a software stored in said memories and executable by said processing devices.

The configuration computerized unit 50 may consist of a single computerized unit or of several computerized units connectable to the Internet and interacting one with another, for example to implement a cloud computing architecture.

As an example, the configuration computerized unit 50 may be a computer unit provided with an operating system for devices with "server" type functionalities, for example Windows Server™, Windows Azure™, Mac OS Server™ or the like.

Preferably, the accessory device 1 is configured to interact with the configuration computerized unit 50 in a configuration stage.

Preferably, the accessory device 1 is configured to upload the data-gathering file DGF from the configuration computerized unit 50 during a configuration stage.

Preferably, the accessory device 1, the interface computerised unit 40 and the configuration computerized unit 50 are configured to execute a configuration procedure CFP, in which configuration information, which is necessary to allow the accessory device 1 to properly operate, is set up.

Figure 9:
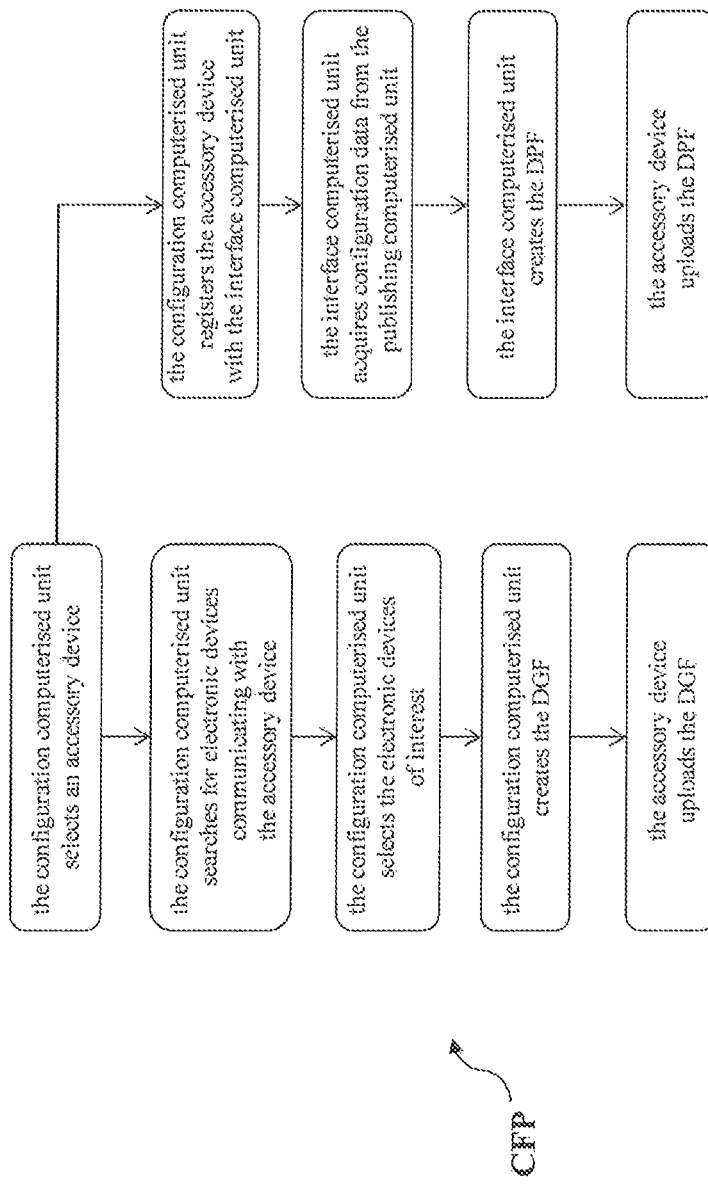

As shown in FIG. 9, the configuration procedure CFP comprises an initial step, in which the configuration computerised unit 50 selects the accessory device 1 as a device to be configured on the base of input data provided by a user.

The configuration procedure CFP comprises a further step, in which the configuration computerised unit 50 connects with the accessory device 1 (which in this case operates as a "client" device) through the communication port 12 of this latter (in other words through the Internet) to search for possible electronic devices 21, 2A, 2B, 2C, 2D of the electric power distribution grid 250, which are in communication with the accessory device 1 through the communication port 11 of this latter.

The configuration procedure CFP comprises a step, in which the configuration computerised unit 50 selects the electronic devices 21, 2A, 2B, 2C, 2D of interest on the base of input data provided by a user (through a suitable user interface of the configuration computerised unit 50). The configuration procedure CFP comprises a step, in which the configuration computerised unit 50 creates a data-gathering file DGF on the base of input data provided by a user.

The configuration procedure CFP then comprises a step, in which the accessory device 1 (which also in this case operates as a "client" device) uploads the data-gathering file DGF from the configuration computerised unit 50.

The configuration procedure CFP comprises also some steps in which the configuration computerised unit 50 interacts also with the interface computerised unit 40.

These steps may be executed in parallel with the steps described above.

The configuration procedure CFP comprises, in fact, a step, in which the configuration computerised unit 50 registers the accessory device 1 with the interface computerised unit 40. The configuration procedure CFP then comprises a step, in which the interface computerised unit 40 connects with the publishing computerised unit 30 to acquire from this latter configuration data to allow the accessory device 1 to communicate with said publishing computerised unit.

The configuration procedure CFP then comprises a step, in which the interface computerised unit 40 creates the data-publishing file DPF on the base of input data provided by a user.

The configuration procedure CFP then comprises a step, in which the accessory device 1 (which also in this case operates as a "client" device) uploads the data-publishing file DPF from the interface computerised unit 40.

When both the data-gathering file DGF and the data-publishing file DPF are uploaded by the accessory device 1, this latter is ready to interact with the electronic device 21, 2A, 2B, 2C, 2D and with the publishing computerised unit 30.

From the above, it is evident that an important aspect of the invention relates also to a computerized platform 100 for remotely monitoring the operation of an electric power distribution grid 250.

In general terms, the computerized platform 100 comprises one or more accessory devices 1, as described above. Each accessory device 1 is operatively coupled with or comprised in a corresponding electronic protection relay 2 of the electric power distribution grid 250.

Preferably, the computerised platform 100 comprises one or more publishing computerised units 30 capable of communicating with the accessory devices 1 through the Internet. Each publishing computerised unit 30 is configured to interact with one or more corresponding accessory devices 1 to acquire and store grid data D related to the operation of the electric power distribution grid 250.

Preferably, the computerised platform 100 comprises one or more interface computerized units 40 capable of communicating with the accessory devices 1 and the publishing computerised units 30 through the Internet. Each interface computerized unit 40 is configured to provide interface services to facilitate the interaction of one or more corresponding accessory devices 1 with one or more corresponding publishing computerised units 30.

Preferably, the computerized platform 100 comprises one or more configuration computerized units 50 capable of communicating with the accessory devices 1 and the interface computerised units 40 through the Internet. Each configuration computerized unit 50 is configured to manage the configuration one or more corresponding accessory devices 1.

The accessory device 1, according to the invention, allows fully satisfying the market needs mentioned above.

The accessory device 1 provides high levels of Internet connectivity to the electronic protection relay 2, in which it is mounted or included.

In this way, grid data D related to the operation of the electric power distribution grid 250 can be easily transmitted through the Internet to a cloud computing architecture, which can further process them to provide high added-value services to a customer, e.g. historical analysis services, energy cost management services, grid efficiency management services and the like.

The accessory device 1 is characterised by a marked functional flexibility in operation, which makes it capable of operating in a transparent way with respect to the electronic devices 21, 2A, 2B, 2C, 2D included in or operatively connected with the electronic protection relay 2 and with respect to a cloud computing architecture including the publishing computerised unit 30 connected thereto.

Grid data D can be efficiently collected and transmitted through the Internet independently from the proprietary configuration of said electronic devices and said publishing computerised unit. The accessory device 1 allows a secure access to confidential data relating to the diagnostics of the electronic protection relays so that servicing measures of predictive type can be taken at cloud computing level.

The accessory device 1 can be integrated in a very cheap way with an electronic protection relay 2 without remarkable changes on the internal communication bus of this latter or the communication buses operatively connected thereto.

The accessory device 1 may be easily installed on an already existing electronic protection relay 2 according to a "plug & play" mode.

The accessory device 1 is thus particularly adapted for retrofitting interventions to expand the functionalities of already existing electronic protection relays due to its capability of easily interacting with communication interfaces (the accessory devices 22, 24) suitable to interface with communication buses widely adopted in existing switchgears, such as RS485 communication buses, or with communication buses internal to the switchgear and having functional purposes (e.g. FIELDBUS communication buses).

The accessory device 1 can be easily configured or updated from a remote location and through the Internet with remarkable savings in terms of cost and time and reduced probability of installation errors.

This capability provides also remarkable advantages in terms of safety (e.g. against hacking) and with an improved possibility of expanding its capabilities according to the needs.

The accessory device 1 is of easy and cheap realization at industrial level.

The invention claimed is:

1. An accessory device for an electronic protection relay comprising:
    a housing including a first mechanical connection structured to mechanically couple the housing of the accessory device to a first external surface of a switching device housing of a switching device, and a second mechanical connection structured to mechanically couple the housing of the accessory device to a second external surface of a relay housing of the electronic protection relay;

a first communication port for communication with one or more electronic devices of said electronic protection relay or operatively connected with said electronic protection relay;

a second communication port for communication with one or more computerized units through the Internet; and first processing means to manage the operation of said accessory device, said first processing means being operatively coupled with said first and second communication ports;

wherein said accessory device is configured to execute a data-gathering procedure (DGP), in which said accessory device polls one or more electronic devices, which are in communication with said accessory device through said first communication port, and receives grid data (D), related to the operation of an electric power distribution grid including said electronic protection relay, from said electronic devices, wherein said data-gathering procedure (DGP) comprises a sequence of steps that are cyclically repeated by said accessory device at subsequent sampling periods (TS) to acquire subsequent data-gathering samples (DGS) of grid data (D), the duration of said sampling periods being specified in a data-gathering file (DGF) stored in said accessory device, wherein said accessory device is configured to execute a data-publishing procedure (DPP), in which said accessory device transmits said grid data (D) to a publishing computerized unit, which is in communication with said accessory device through said second communication port, wherein said accessory device is configured to operate as a client device to implement a data-upload procedure (DUP), in which said accessory device receives upload data (UD) from an interface computerized unit, wherein said data-upload procedure (DUP) comprises a sequence of steps that are cyclically repeated by said accessory device at subsequent updating periods (TU) to receive said upload data (UD) from said interface computerized unit, and wherein said accessory device is configured to interact with a configuration computerized unit through said second communication port, said accessory device configured to upload said data-gathering file (DGF) from said configuration computerized unit, said data-gathering file being created in response to said configuration computerized unit searching for the electronic devices through the second communication port and selecting a portion of the electronic devices based on input data provided by the user.

2. The accessory device according to claim 1, wherein said data-gathering procedure (DGP) is operable to:

send one or more data-gathering queries (DGQ) to electronic devices in communication with said accessory device through said first communication port;

receive data-gathering responses (DGR) from said electronic devices;

analyse said data-gathering responses (DGR) to check the presence of errors;

store data-gathering samples (DGS) of grid data received from the electronic devices for which no errors are found in said data-gathering responses; or repeat the previous acts for the electronic devices for which errors are found in said data-gathering responses;

stop the interrogation of the electronic devices for which errors are still found in said data-gathering responses after said previous acts are repeated for a given number of times.

3. The accessory device according to claim 2, which is further configured to execute a data logging procedure (DLP), in which said accessory device refines and reorganizes the stored data samples (DGS) of grid data.

4. The accessory device according to claim 3, wherein said data logging procedure (DLP) comprises the following acts:

wait for a plurality of data-gathering samples (DGS) of grid data be stored;

generate a data logging record (DLR) using said plurality of stored data-gathering samples (DGS) of grid data;

store said data logging record (DLR).

5. The accessory device according to claim 4, wherein said data logging procedure (DLP) comprises the act of processing said data-gathering samples (DGS) of grid data to obtain additional information on the operation of said electric power distribution grid.

6. The accessory device according to claim 2, wherein said data-publishing procedure (DPP) comprises the following acts:

upload a plurality of data-publishing samples (DPS) of grid data;

create a transmission file (TF) having a predefined transmission format and including said data-publishing samples (DPS) of grid data;

transmit said transmission file (TF) to said publishing computerised unit.

7. The accessory device according to claim 1, wherein said data-publishing procedure (DPP) comprises the following acts:

upload a plurality of data-publishing samples (DPS) of grid data;

create a transmission file (TF) having a predefined transmission format and including said data-publishing samples (DPS) of grid data;

transmit said transmission file (TF) to said publishing computerized unit.

8. The accessory device according to claim 1, wherein said accessory device is configured to interact with an interface computerized unit, which is capable of communicating with said accessory device through said second communication ort, said interface computerized unit being configured to provide interface services to facilitate the interaction of said accessory device with said publishing computerised unit.

9. The accessory device according to claim 8, wherein said accessory device is configured to interact with a configuration computerized unit, which is capable of communicating with said accessory device through said second communication port, said configuration computerized unit being configured to manage an operative configuration of said accessory device.

10. The accessory device according to claim 1, wherein said accessory device is configured to execute said data-gathering procedure (DGP) basing on information included in a stored data-gathering file (DGF).

11. The accessory device according to claim 1, wherein said accessory device is configured to execute said data-publishing procedure (DPP) basing on information included in a stored data-gathering file (DGF) and data-publishing file (DPF).

12. The accessory device according to claim 11, wherein the interface computerized unit creates the data-publishing file (DPF) based on user input.

13. The accessory device according to claim 12, wherein the publishing computerized unit and accessory device are able to communicate with each other after the interface computerized unit registers the accessory device with the publishing computerized unit and receives configuration data from the publishing computerized unit.

14. The accessory device according to claim 13, wherein the accessory device is configured to communicate with the electronic devices and the publishing computerized unit once the accessory device uploads both the data-gathering file (DGF) and the data-publishing file (DPF).

15. A computerized platform for monitoring the operation of an electric power distribution grid characterised in that it comprises an accessory device according to claim 1, said accessory device being operatively coupled with or comprised in an electronic protection relay of said electric power distribution grid.

16. The accessory device according to claim 1, wherein said accessory device is configured to interact with the interface computerized unit, which is capable of communicating with said accessory device through said second communication port, said interface computerized unit being configured to provide interface services to facilitate the interaction of said accessory device with said publishing computerized unit.

17. The accessory device according to claim 1, wherein said data-publishing procedure (DPP) comprises a sequence of steps that are cyclically repeated by said accessory device at subsequent publishing periods (TP) to transmit a transmission file (TF) to said publishing computerized unit, said transmission file having a predefined transmission format including data-publishing samples (DPS) of grid data uploaded at corresponding loading periods having a duration shorter than or equal to the duration of said publishing period (TP), the duration of said publishing period (TP) and of said uploading periods (TU) being specified in the data-gathering file (DGF) stored in said accessory device.

18. The accessory device according to claim 1, wherein said accessory device is configured to execute a data-publishing procedure (DPP) as a client device.

* * * * *